United States Patent
Takafuji et al.

(10) Patent No.: US 6,662,138 B1
(45) Date of Patent: Dec. 9, 2003

(54) SEATED PERSON DETERMINATION APPARATUS FOR VEHICLE SEATS

(75) Inventors: Tetsuya Takafuji, Anjo (JP); Tomoji Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 268 days.

(21) Appl. No.: 09/707,767

(22) Filed: Nov. 8, 2000

(30) Foreign Application Priority Data

Nov. 9, 1999 (JP) ............................................ 11-318652
Aug. 25, 2000 (JP) ........................................ 2000-255906

(51) Int. Cl.[7] ................................................. G01B 7/28
(52) U.S. Cl. ..................................................... 702/173
(58) Field of Search ........................ 702/173; 177/144; 280/735, 728; 701/45–49; 359/601

(56) References Cited

U.S. PATENT DOCUMENTS

| 5,454,591 A | 10/1995 | Mazur et al. |
| 5,482,314 A | * 1/1996 | Corrado et al. ............. 280/735 |
| 5,573,269 A | 11/1996 | Gentry et al. |
| 6,242,701 B1 | * 6/2001 | Breed et al. ................. 177/144 |

FOREIGN PATENT DOCUMENTS

| JP | 10-194077 | 7/1998 |
| JP | 11-248409 | * 9/1999 |

* cited by examiner

Primary Examiner—John Barlow
Assistant Examiner—Tung Lau
(74) Attorney, Agent, or Firm—Harness, Dickey & Pierce, PLC

(57) ABSTRACT

The present invention provides a seated person determination apparatus for a vehicle seat that accurately differentiates the type of person seated, or differentiates a person seated from an object such as a child seat. This is accomplished by utilizing the shape of the standard surface distribution of the load that simulates the shape of contact surface formed between the human buttocks and the surface of seat pad. Specifically, the present invention provides a seat sensor composed of the plurality of sensor portions placed in a seat pad of a vehicle seat distributed in a plane parallel with the surface of the seat. The load exerted on the surface of the seat by a person seated or an object placed on the seat is detected by the plurality of sensor portions of the seat sensor located in corresponding position.

12 Claims, 12 Drawing Sheets

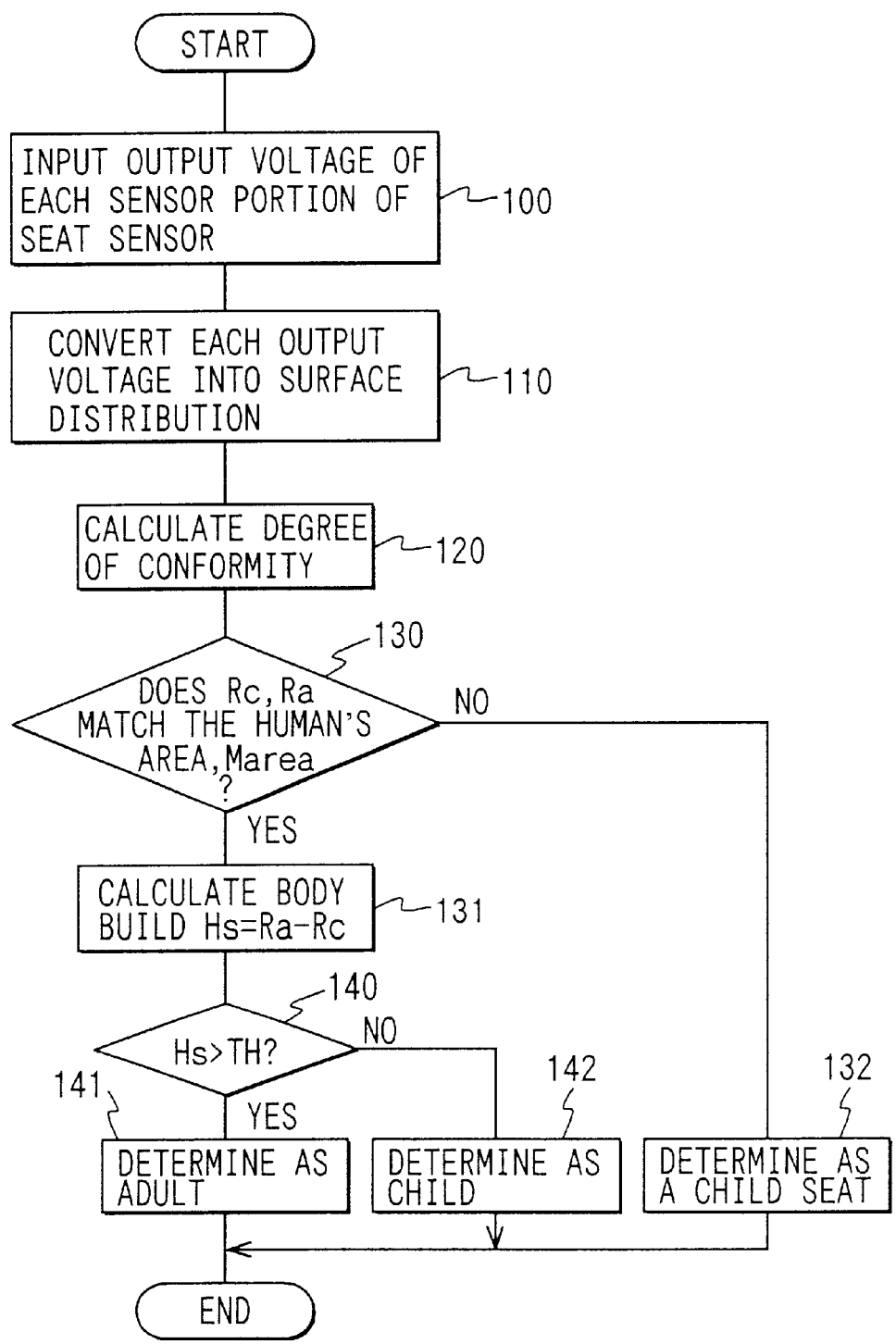

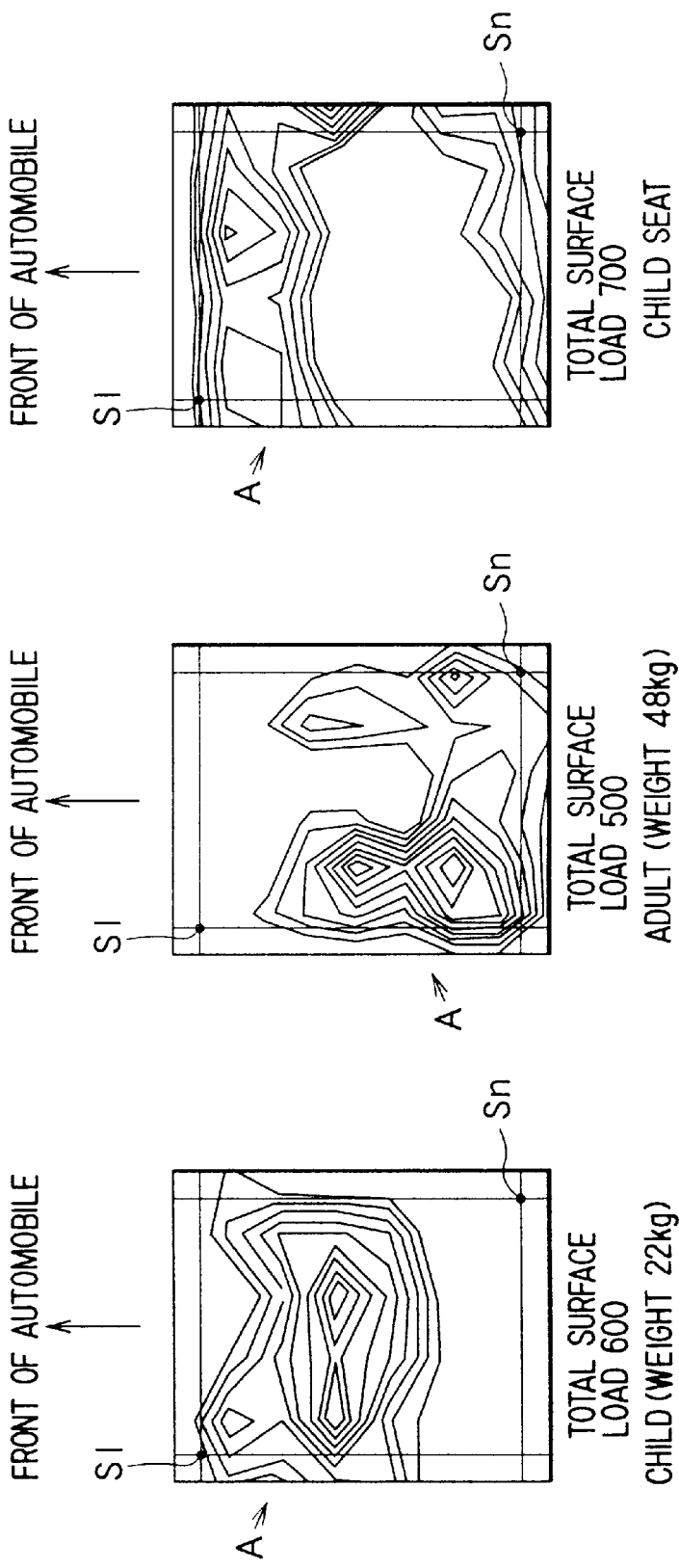

FIG. 8

| | CHILD (WEIGHT 22kg) | ADULT (WEIGHT 48kg) | CHILD SEAT |
|---|---|---|---|
| THE SHAPE OF SURFACE DISTRIBUTION OF OUTPUT VOLTAGE | | | |
| TOTAL SURFACE LOAD | 600 | 500 | 700 |
| CHILD'S PATTERN CORRELATION COEFFICIENT, Rc | 0.75 | 0.61 | 0.52 |
| ADULT'S PATTERN CORRELATION COEFFICIENT, Ra | 0.62 | 0.72 | 0.60 |
| DETERMINATION RESULT | CHILD | ADULT | CHILD SEAT |

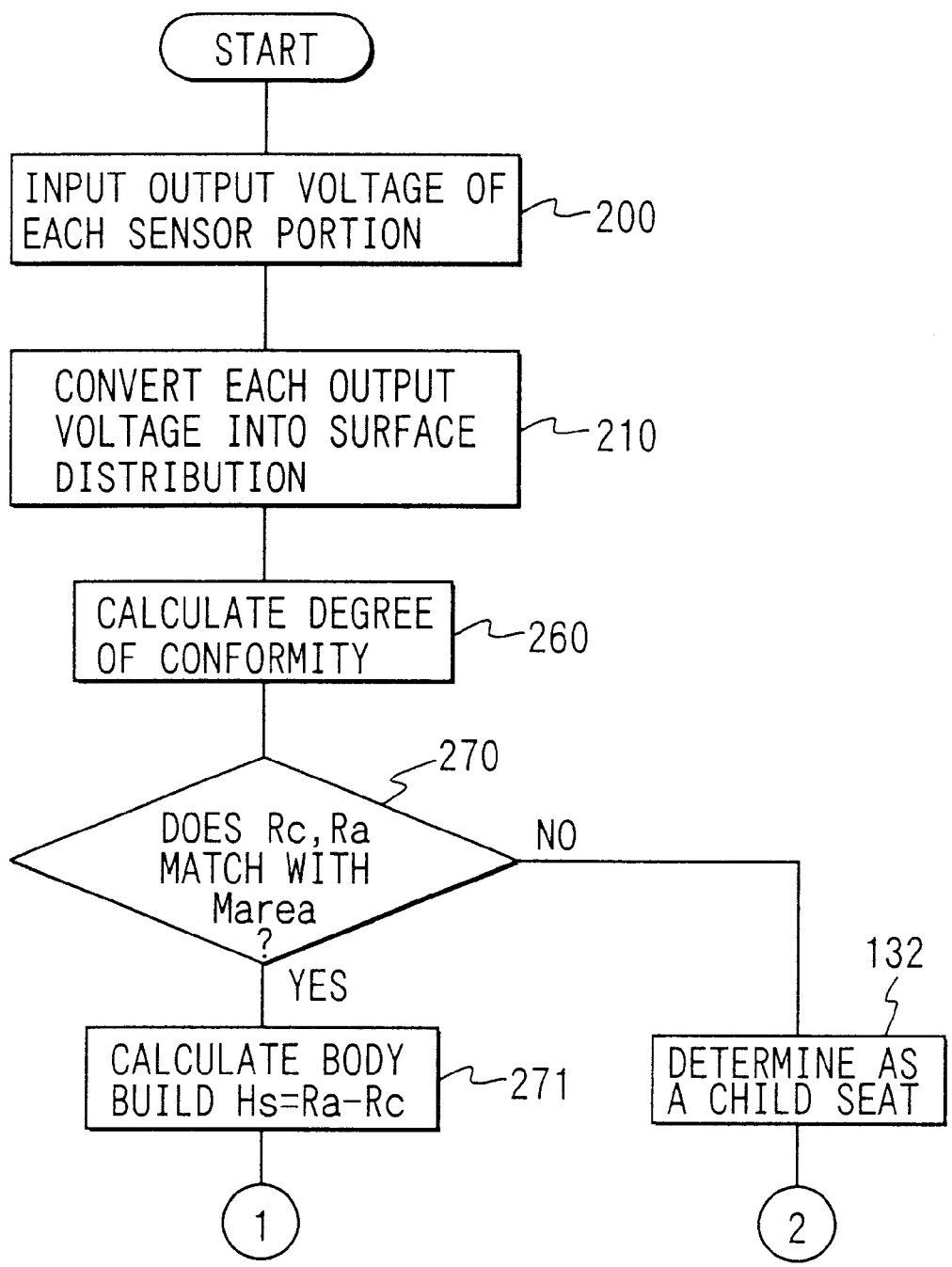

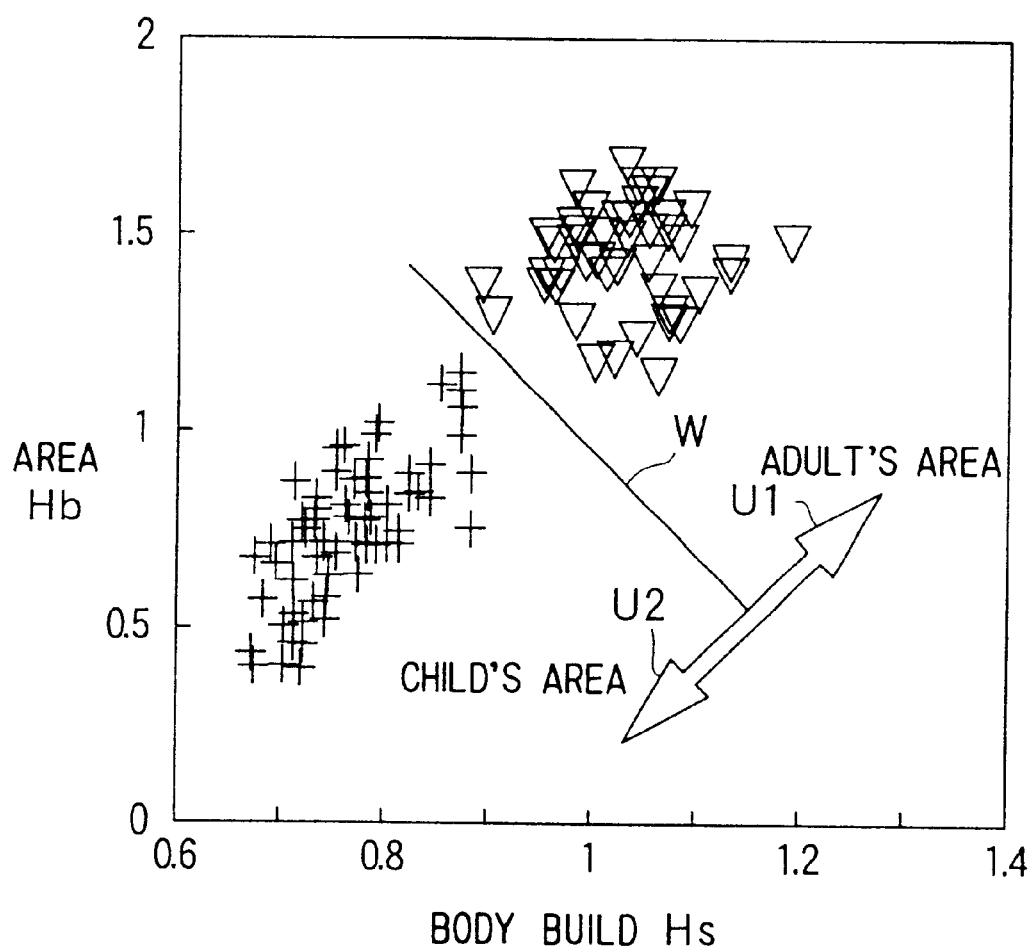

SEATED PERSON DETERMINATION APPARATUS FOR VEHICLE SEATS

CROSS-REFERENCE TO RELATED APPLICATION

The present invention is related to Japanese patent application No. Hei. 11-318652, filed Nov. 9, 1999 and application No. Hei. 2000-255906, filed Aug. 25, 2000; the contents of which are incorporated herein by reference.

FIELD OF THE INVENTION

The present invention relates to a seated person determination apparatus for vehicle seats, and more particularly, to a determination apparatus for vehicle seats that distinguishes between adults, children and objects.

BACKGROUND OF THE INVENTION

In a conventional apparatus for determining the seated condition of seated persons, an apparatus utilized in vehicle air bag systems, determination of the type of person seated is made by imbedding pressure sensors in the seat pad of the seat. These sensors are arranged so that the body weight of the person seated is detected as a load by the pressure sensors.

In a seated condition determination apparatus mentioned above, the determination standard is either the detected load or the area determined by the distribution of the detected load. In other words, there is no information concerning the shape contained in either the detected load or its area of distribution. Consequently, the determination standard fluctuates, caused by the person seated shifting his or her position, or by the vertical movements of the vehicle traveling on rough roads.

For instance, where the actual body weight of the person seated and the load applied to the seat was reversed. The load detected by the pressure sensor fluctuated as the person seated changed the sitting attitude. Consequently, problems occur in the determination method using a detected load, including misjudging adult for a child, or misjudging a child for an adult.

In addition, when a child seat is attached to the seat, sometimes, a greater load is exerted onto to the seat than that exerted by a seated adult. Consequently, when determination is made based on this detected load, a child seat may be misjudged for an adult.

SUMMARY OF THE INVENTION

The present invention provides a seated person determination apparatus for vehicle seats that accurately differentiates the type of person seated, or differentiates a person seated from an object such as a child seat. This is accomplished by utilizing the shape of the standard surface distribution of the load that simulates the shape of contact surface formed between the human buttocks and the surface of seat pad. Specifically, the present invention provides a seat sensor composed of a plurality of sensor portions placed in a seat pad of a vehicle seat distributed in a plane parallel with the surface of the seat. The load-exerted on the surface of the seat by a person seated or an object placed on the seat is detected by the plurality of sensor portions of the seat sensor located in corresponding position.

The present invention also calculates a degree of conformity between the shape of the surface distribution of the load detected by the plurality of sensor portions and the shape of the standard surface distribution of the load. The shape of the standard surface distribution of the load, mentioned above, simulates the shape of contact surface formed between the buttocks of the person seated and the surface of seat. This determination is made utilizing the fact that the shape of contact surface, formed between the buttocks of the person seated and the surface of seat pad, remains nearly constant regardless of the shift in the sitting attitude of the person seated. A shape of a standard surface distribution of the load simulating the shape of the contact surface formed between the seated person's buttocks and the surface of seat pad has been adopted. The type of person seated is differentiated from an object placed on the seat, according to the degree of conformity between the shape of the surface distribution of the load detected by each sensor, and the shape of the standard surface distribution of the load. This is accomplished without relying on the weight of the person seated or the area of the load distribution. Consequently, the accuracy of determination, differentiating the type of person seated from an object placed on the seat is significantly improved.

In another aspect, the means of calculating the degree of conformity makes the calculation from the shape of the standard surface distribution of the load, mentioned above, and the shape of the surface distribution of detected load, mentioned above. The degree of conformity is calculated as a child's pattern correlation coefficient and adult's pattern correlation coefficient, utilizing a cross correlation method.

The decision means determines whether the child's pattern correlation coefficient and the adult's pattern correlation coefficient match the human area or the object placed on the seat area. The human area and the object placed on the seat area are established by matching the distribution of the correlation coefficients with a large number of cases of human and objects placed on the seat. The child's pattern correlation coefficient and adult's pattern correlation coefficient, obtained from the cross correlation method, are utilized to determine whether it matches the human area or object placed on the seat area. The type of person seated is determined in this manner by differentiating it from the object placed on the seat. In another aspect, the means of calculating the degree of conformity makes the calculation from the shape of the standard surface distribution of the load, mentioned above, and the shape of the surface distribution of the detected load, mentioned above. The degree of conformity is calculated as a child's pattern correlation coefficient and adult's pattern correlation coefficient, utilizing the cross correlation method.

The decision means differentiates the type of person seated from an object placed on the seat by determining which of the adult's area, child's area or object placed on the seat area matches the child's pattern correlation coefficient and adult's pattern correlation coefficient. The child's area, adult's area and the object placed on the seat area are established by, matching the distribution of these correlation coefficients with large number of cases of adults, children, and objects placed on the seats. The determination made, by differentiating the type of person seated from an object placed on the seat in this manner are the characteristics of this apparatus.

The type of person seated is determined by differentiating it from the object placed on the seat in this manner. The child's pattern correlation coefficient and adult's pattern correlation coefficient obtained from the cross correlation method are utilized to determine whether it matches the adult's area, child's area, or the objects placed on the seat area. In another aspect, the present invention comprises a seat sensor composed of the plurality of sensor portions placed in the seat pad of vehicle seats, distributed in a plane parallel to the surface of the seat pad. The load exerted on the surface of the seat pad by a person seated is detected by the plurality of sensor portions of the seat sensor located in corresponding positions. A means is provided to calculate a degree of conformity between the shape of the surface distribution of the load detected by the plurality of sensor portions, mentioned above, and the shape of the standard surface distribution of the load. The shape of the standard surface distribution of the load simulates the shape of the contact surface formed by the buttocks of the person seated and the surface of seat. A decision means is provided to differentiate the type of person seated on the seat according to the degree of conformity.

The type of person seated is determined according to the degree of conformity between the shape of the surface distribution of the load detected by each sensor portion of the seat sensors and the shape of the standard surface distribution of the load. The determination is made without having to depend on the weight of the person seated or the area of the load distribution. Therefore, the accuracy of determining the type of person seated is increased significantly.

In another aspect, the means of calculating the degree of conformity makes the calculation from the shape of the standard surface distribution of the load, mentioned above, and the shape of the surface distribution of the detected load, mentioned above. The degree of conformity is calculated as the child's pattern correlation coefficient and adult's pattern correlation coefficient, utilizing the cross correlation method.

The decision means determines whether the child's pattern correlation coefficient and the adult's pattern correlation coefficient match the adult's area or child's area. The adult's area and the child's area are established by matching the distribution of these correlation coefficients with large number of cases of adults, and children seated on the seat. Differentiating the type of person seated in this manner is the characteristic of this apparatus. The type of person seated is determined by deciding whether it matches the adult's area or child's area utilizing the children's pattern correlation coefficient and adult's pattern correlation coefficient.

In another aspect, the seated person determination apparatus for vehicle seats comprises a seat sensor composed of the plurality of sensor portions placed in the seat pad of vehicle seats. The sensor portions are distributed in matrix form, in parallel to the surface of the seat. The load exerted on the surface of the seat, mentioned above, by a person seated is detected by the plurality of sensor portions of the seat sensor located in corresponding positions In another aspect of the invention, a means is provided to calculate the sum of each load detected, out of the load detected by the plurality of sensor portions, that show movement of the seated person, from opposite sides of the seat pad surface in left and right direction, toward the center of the seat pad surface in left and right direction, on a surface parallel to a plane orthogonal to the surface of seat pad in left and right direction. The sum is calculated in a range below the prescribed load.

In another aspect of the invention, a seated person determination apparatus for vehicle seats, comprises a seat sensor composed of the plurality of sensor portions placed in the seat pad of vehicle seats. The sensor portions are distributed in a plane parallel to the surface of the seat. The load exerted on the surface of the seat, mentioned above, by a person seated or by an object placed on the seat is detected by the plurality of sensor portions of the seat sensor located in corresponding positions. A conformity calculating device calculating a degree of conformity between the shape of the surface distribution of the load detected by the plurality of sensor portions mentioned above, and the shape of the standard surface distribution of the load. The shape of the standard surface distribution of the load simulates the shape of contact surface formed by the buttocks of the person seated and the surface of seat. A means to calculate the sum of each detected load, that shows movement of the seated person from opposite sides of the seat pad surface toward its center in left and right direction, out of the detected load of the plurality of sensor portions. The calculation is made in a range below the prescribed load. A means is provided to synthesize the synthesized data that enable determination of whether the person seated is an adult or a child, from the sum of the load calculated by the means of calculating the sum and the degree of conformity. It also comprises a decision means to determine whether the person seated is an adult or a child, differentiating it from an object placed on the seat based on the synthesized data.

By synthesizing the data from the degree of conformity and the sum of the load calculated by the means of calculating the sum, that enables differentiation of a child seated from an adult seated.

A means is provided to calculate the sum of each load detected, out of the load detected by the plurality of sensor portions that show movement of the seated person, from opposite sides of the seat pad surface in left and right direction, toward the center of the seat pad surface in left and right direction, on a surface parallel to a plane orthogonal to the surface of seat pad in left and right direction. The sum of the load is calculated in a range less than the prescribed load.

In another aspect, a seated person determination apparatus for vehicle seats, comprises a seat sensor composed of the plurality of sensor portions placed in the seat pad of vehicle seats. The sensor portions are distributed in a plane parallel to the surface of the seat. The load exerted on the surface of the seat, mentioned above, by a person seated or an object placed on the seat is detected by the plurality of sensor portions, of the seat sensor, located in corresponding positions.

A means is provided to calculate a degree of conformity between the shape of the surface distribution of the load detected by the plurality of sensor portions and the shape of the standard surface distribution of the load. The shape of the standard surface distribution of the load simulates the shape of contact surface formed by the buttocks of the person seated and the surface of seat.

A means is provided to calculate the sum of each load detected, out of the load detected by the plurality of sensor portions, that show movement of the seated person, from opposite sides of the seat pad surface toward the center of the seat pad surface in left and right direction. The sum is calculated in a range below the prescribed load.

A means is provided to synthesize the synthesized data that enable determination of whether the person seated is an adult or a child, from the sum of the load calculated by the means of calculating the sum, and the degree of conformity. A decision means is provided to determine whether the person seated is an adult or a child, based on the synthesized data, mentioned above.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is a flow chart showing the operation of a microcomputer for a seated person determination apparatus for a seated person according to the present invention;

FIG. 6A is a chart showing the shape of the surface distribution of output voltage of the sensor portions when a child is seated in the seat for a seated person determination apparatus for a seated person according to the present invention;

FIG. 6B is a chart showing the shape of the surface distribution of output voltage of the sensor portions when an adult is seated in the seat for a seated person determination apparatus for a seated person according to the present invention;

FIG. 6C is a chart showing the shape of the surface distribution of output voltage of the sensor portions when a child seat is placed on the seat;

FIG. 8 is a chart showing the shape of the surface distribution of output voltage, total surface load, child's pattern correlation coefficient, adult's pattern correlation coefficient, and the results of determination classified by adult, child, and child seat for a seated person determination apparatus for a seated person according to the present invention;

FIG. 13 is a flow chart of a computer program executed by the microcomputer in the third embodiment of the present invention;

FIG. 15 is a chart showing the relationship between the area Hb and body build Hs expressed as relationship between child's area and adult's area according to the present invention.

DETAILED DESCRIPTION OF THE INVENTION

Figure 1:
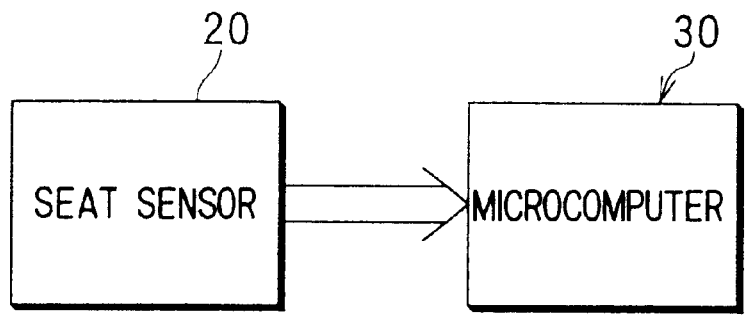
FIG. 1 is a block diagram showing the first embodiment of the present invention.
Figure 2:
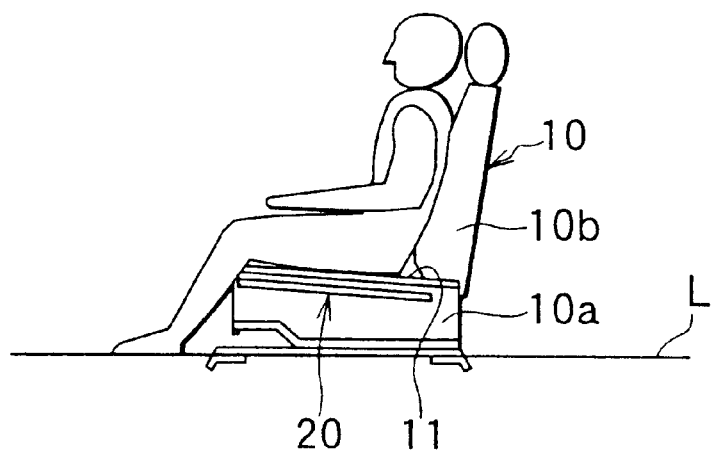
FIG. 2 is a side view showing the configuration of seat sensor installation and the seating condition of a person seated for a seated person determination apparatus for a seated person according to the present invention.

FIG. 1 is a block diagram showing the first embodiment of the seated person determination apparatus for automobile seat for the present invention. The automobile is equipped with a seat 10 shown in FIG. 2 mounted in its interior. The seat 10 is composed of a seat pad 10a anchored to the floor of the interior of the automobile, and a backrest 10b.

The seated person determination apparatus comprises a seat sensor 20, and a microcomputer connected to the seat sensor 20, as shown in FIG. 1. The seat sensor is flat, and embedded inside the seat pad 10a in parallel with the surface of the seat 11.

Figure 3A:
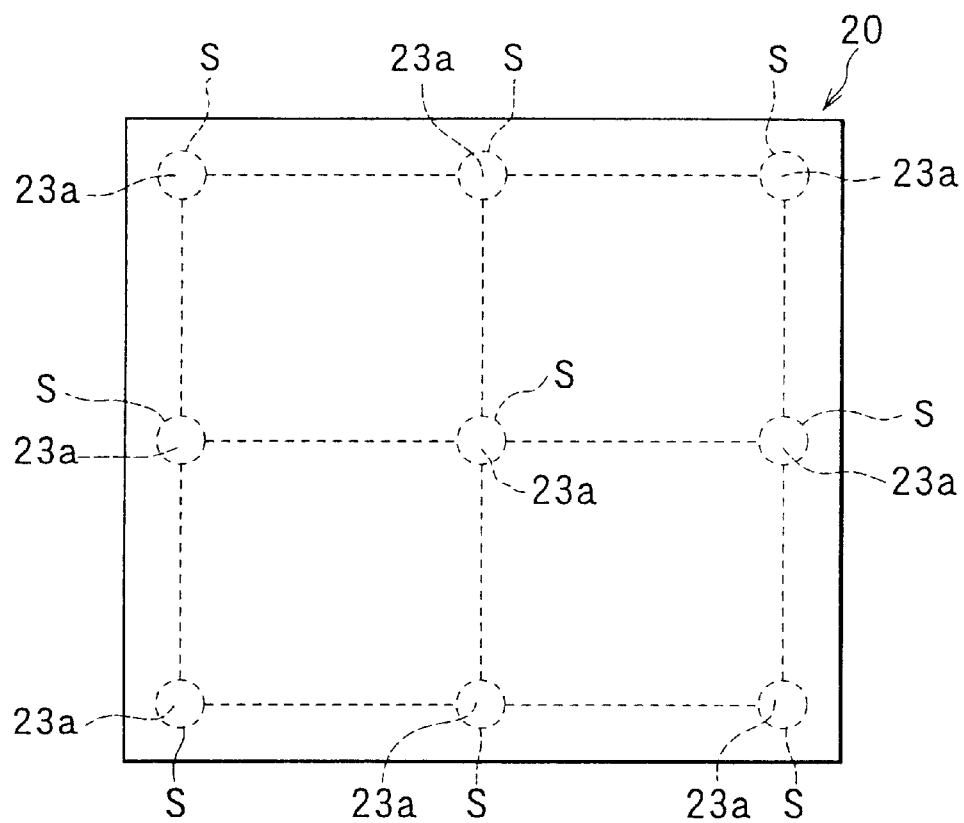
FIG. 3A is a plan view of a seat sensor for a seated person according to the present invention.
Figure 3B:
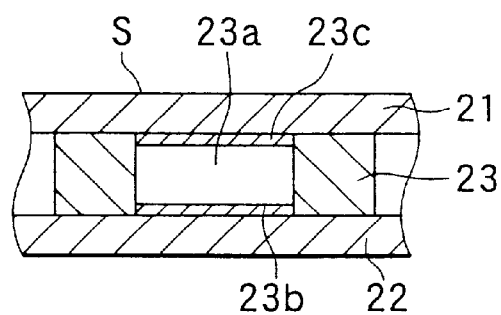
FIG. 3B is a partial cross sectional diagram of a seat sensor for a seated person determination apparatus for a seated person according to the present invention.

The seat sensor is composed of a top and bottom wall 21, 22 made of elastic resin material that is electrical insulator, as shown in FIG. 3B. The top and bottom walls 21, 22 are held in parallel to each other by means of partitions 23 made of rigid material. The partitions 23 are inserted between the top and bottom walls 21, 22 to form a narrow gap (for instance 0.2 mm) between the top and bottom walls 21, 22. The partition 23 divides the narrow gap between the top and bottom walls 21, 22 in a matrix shape forming a number of narrow gaps 23a.

Each narrow gap 23a has flat circular shape, as shown in FIG. 3A. Resistor films 23c, 23b, made of conductive resistor material, are mounted inside the top and bottom surface of these narrow gaps 23a (Refer to FIG. 33B.) In the seat sensor 20 composed in this manner, a sensor portion S is formed in each narrow gap 23a. The sensor portion S is composed of a narrow gap 23a, both resistor films 23b, 23c, and the top and bottom walls 21, 22 corresponding to the narrow gap 23a. In FIG. 3 only nine sensor portions S are shown for convenience, but large number of these sensor portions S are placed in matrix shape on a seat sensor. When a person sits on the seat 10a, or when a child seat is placed on the seat 10a, part of the top wall 21 corresponding to the narrow gap 23a is bent downward causing the resistor film 23c to contact the resistor film 23b. The resistance varies inversely proportional to the pressure applied to make the contact. The sensor portions S are mutually connected in parallel. Each sensor portion S generates output voltage (hereafter also called output voltage m) that indicates the load m corresponding to its resistance.

The microcomputer 30 executes the computer program following the flow chart shown in FIG. 4. During this execution, a decision process that differentiates the type of person seated from a child seat is performed. Incidentally, the computer program, mentioned above, is pre-stored on a ROM of the microcomputer 30.

In the first embodiment composed in this manner, the microcomputer 30 starts to execute the computer program following the flow chart shown in FIG. 4. When it reaches step 100, the output voltage m of each sensor portion S of the seat sensor is input. In the explanation that follows, each sensor portion S shown in FIG. 3A will be successively assigned a symbol. The order of assignment will start from the left most column in the figure going to the right, and starting from the top row going to the bottom, expressing the sensor portions as S1, S2, . . . Si, . . . , Sn (Refer to FIG. 5.) Correspondingly, the output voltage m of each sensor portion S 1, S2, . . . Si will be expressed as m1, m2, . . . , mi, . . . , mn. Consequently, at step 100, the output voltage mi (i=1, 2, . . . n) of sensor portion Si is input successively from S1 to Sn.

Figure 5:
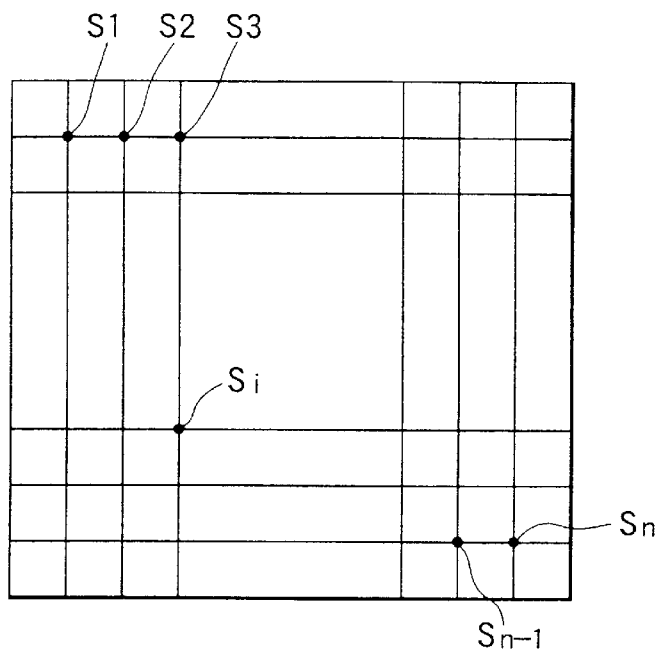
FIG. 5 is a display of a sensor portions S i j of a seat sensor for a seated person determination apparatus for a seated person according to the present invention.

At this stage, it is assumed that either a person is seated or a child seat is placed on the seat pad 10a of the seat 10. Additionally, it is assumed that each sensor portion Si shown in the top row of FIG. 5 is facing the front of the automobile, and that each sensor portion Si shown in the bottom row of the figure is facing the rear of the automobile.

Next, in step 110, each output voltage mi is processed into a surface by distributed processing corresponding to the position of each sensor portion Si in the seat sensor. The output voltage mi is converted into a shape of the surface distribution of the output voltage, in this manner. For example, when the person sitting on the seat 10 is a child, the shape of the surface distribution of output voltage of each sensor portion Si in the seat pad 10a will be as shown in FIG. 6A. In FIG. 6A, symbol A indicates the shape of the contact surface formed between the child's buttocks and the seat pad 10a. Where, it is assumed the weight of the child is 22 Kg, and the total surface load corresponding to the sum of output voltage from each sensor portion Si is 600.

When the person sitting on the seat 10 is an adult, the shape of the surface distribution of output voltage of each sensor portion Si in the seat pad 10a will be as shown in FIG. 6B. In FIG. 6B, symbol A indicates the shape of the contact surface formed between the adult's buttocks and the seat pad 10a. Where, it is assumed the weight of the adult is 48 Kg, and the total surface load corresponding to the sum of output voltage from each sensor portion Si is 500.

Figure 7A:
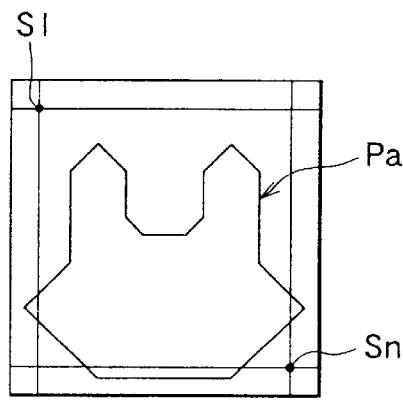
FIG. 7A is a chart showing the shape of the standard surface distribution of voltage including a child's standard pattern, Pa., for a seated person determination apparatus for a seated person according to the present invention.
Figure 7B:
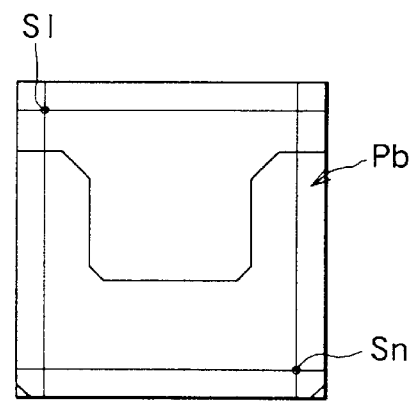
FIG. 7B is a chart showing the shape of the standard surface distribution of voltage including an adult's standard pattern, Pb, for a seated person determination apparatus for a seated person according to the present invention.

When a child seat is placed on the seat pad 10a, the shape of the surface distribution of output voltage of each sensor portion Si in the seat pad 10a will be as shown in FIG. 6C. In FIG. 6C, A indicates the shape of the contact surface formed between the bottom wall of the child seat and the seat pad 10a. Where, it is assumed the total surface load of the child seat corresponding to the sum of output voltage from each sensor portion Si is 700. The shape of the surface distribution of output voltage shown in FIG. 6 is shown by a number of curves depicting the shape of distribution, taking into consideration the shape of the distribution of the load. As the processing is finished in step 110, as described above, the following process takes place in step 120. In this step, the degree of conformity, expressing how well the shape of the surface distribution of output voltage, described above, matches the child's voltage shape that contains the child's standard pattern Pa (Refer to FIG. 7A), and the adult's shape of the standard surface distribution of voltage that contains the adult's standard patter Pb (Refer to FIG. 7B), is calculated (Pattern matching process.)

The shape of child's standard surface distribution of voltage, described above, has been selected based on the shape of contact surface formed between the seat pad 10a and the buttocks of large number of children placed in seated position in the seat 10. Additionally, the shape of adult's standard surface distribution of voltage, described above, has been selected based on the shape of contact surface formed between the seat pad 10a and the buttocks of large number of adults placed in seated position in the seat 10. The shape of child's standard surface distribution of voltage and the shape of adult's standard surface distribution of voltage are stored on the ROM of the microcomputer 30 as data.

The degree of conformity, mentioned above, is calculated by obtaining the correlation coefficient R utilizing the cross correlation method based on the following equation (Number 1).

$$R=Rxy/(Rxx \cdot Ryy)^{1/2} \qquad \text{[Number 1]}$$

Where, Rxx, Ryy, Rxy in the equation of Number 1 are expressed in the following equations in Number 2 through Number 4.

$$Rxx=\Sigma(X i^2) \qquad \text{[Number 2]}$$

$$Ryy=\Sigma(Y i^2) \qquad \text{[Number 3]}$$

$$Rxy=\Sigma(Xi \cdot Yi) \qquad \text{[Number 4]}$$

Where, in the equation of Number 2, Xi indicates the value of the shape of the standard surface distribution of voltage at the position corresponding to the position of each sensor portion Si. In the equation of Number 3, Yi indicates the value of the shape of the surface distribution of output voltage at the position corresponding to the position of each sensor portion Si. In Xi and Yi, i is an integer between 1 and n.

Specifically, the degree of conformity mentioned above is calculated as follows. First, Rxx corresponding to each value of Xi of the child's shape of the standard surface distribution of voltage, mentioned above, is calculated based on the equation of Number 2. Then, Ryy corresponding to each value of Yi of the shape of the surface distribution of output voltage, mentioned above, is calculated based on the equation of Number 3.

Additionally, the value of Rxy is calculated as follows by the equation of Number 4. In other words, the center position (corresponds with the position of the sensor portion positioned in the center of the seat sensor, out of each sensor portion Si) in the shape of the standard surface distribution of voltage, mentioned above, is superposed with the position in the left most column in the top row (corresponds with the position of sensor portion S1.) of the shape of the surface distribution of output voltage, mentioned above. The corresponding values in the shape of the standard surface distribution of voltage and the shape of the surface distribution of output voltage are successively multiplied to produce a product of each value (Xi·Yi). Then, the sum of the products (Xi·Yi) is calculated to produce Rxy. Then, the correlation coefficient R is calculated, based on the equation of Number 1, for the corresponding values of Rxy, Rxx, and Ryy calculated as described above.

After the calculating process described above, the center position of the shape of the standard surface distribution of voltage is superposed onto the position next to the position in the left most column in the top row of the shape of the surface distribution of output voltage (corresponds to the position of sensor portion S2.) The corresponding values in the shape of the standard surface distribution of voltage and the shape of the surface distribution of output voltage, mentioned above, are successively multiplied to produce a product of each value (Xi·Yi). Then the sum of each product (Xi·Yi) is calculated to produce Rxy. Then, the correlation coefficient R is calculated, based on the equation of Number 1, for the corresponding values of Rxy, Rxx, and Ryy calculated as described above. In this manner, the center position of the shape of the standard surface distribution of voltage is superposed successively to the remaining positions (corresponds with the positions of sensor portion S3 through Sn) of the shape of the surface distribution of output voltage.

For each superposition made, the corresponding values of the shape of the standard surface distribution of voltage and the shape of the surface distribution of output voltage are successively multiplied to produce a product of each value (Xi·Yi). Then the sum of each product (Xi·Yi) is calculated to produce Rxy. Then, the correlation coefficient R is calculated corresponding to the values of Rxy, Rxx, and Ryy calculated as described above according to the equation of Number 1.

After all of the correlation coefficients R are calculated in this manner, the maximum value out of all the correlation coefficients R is determined as the correlation coefficient that expresses the degree of conformity between the shape of the standard surface distribution of voltage and the shape of the surface distribution of output voltage. In other words, the correlation coefficient expressing the degree of conformity, calculated based on the child's shape of the standard surface distribution of voltage, is determined as the child's pattern correlation coefficient Rc. In addition, the correlation coefficient expressing the degree of conformity, mentioned above, calculated based on the adult's shape of the standard surface distribution of voltage essentially in the same manner as described above, is determined as the adult's pattern correlation coefficient Ra. Additionally, these processes are performed between the shape of the surface distribution of output voltage obtained at step 110, and each child's and each adult's shape of the standard surface distribution of voltage, mentioned above.

Here, the degree of conformity between the child's shape of the surface distribution of output voltage, mentioned above, and the child's shape of the standard surface distribution of voltage, mentioned above, was obtained as Rc=0.75. The degree of conformity between the child's shape of the surface distribution of output voltage, mentioned above, and the adult's shape of the standard surface distribution of voltage, mentioned above, was obtained as Ra=0.62 (Refer to FIG. 8.) The degree of conformity between the adult's shape of the surface distribution of output voltage, mentioned above, and the child's shape of the standard surface distribution of voltage, mentioned above, was obtained as Rc=0.61. The degree of conformity between the adult's shape of the surface distribution of output voltage and adult's shape of the standard surface distribution of voltage was obtained as Ra=0.72 (Refer to FIG. 8.) In addition, the degree of conformity between the child seat's shape of the surface distribution of output voltage and the child's shape of the standard surface distribution of voltage was obtained as Rc=0.52. And the degree of conformity between the child seat's shape of the surface distribution of output voltage and the adult's shape of the standard surface distribution of voltage was obtained as Ra=0.60 (Refer to FIG. 8.). After the processing of step 120 is completed, it is determined in step 130, whether or not the child's pattern correlation coefficient Rc, and adult's pattern correlation coefficient Ra, obtained in step 120, matches the human area, Marea (Refer to FIG. 9.).

Now, the rationale for incorporating the human area Marea, will be explained together with the rationale for incorporating the child seat's area, Carea, adult's area, Larea, and child's area ,Sarea, referring to FIG. 9. The child's pattern correlation coefficient Rc and the adult's pattern correlation coefficient Ra were obtained in the same manner described above for a large number of adults, children, and child seats.

Figure 9:
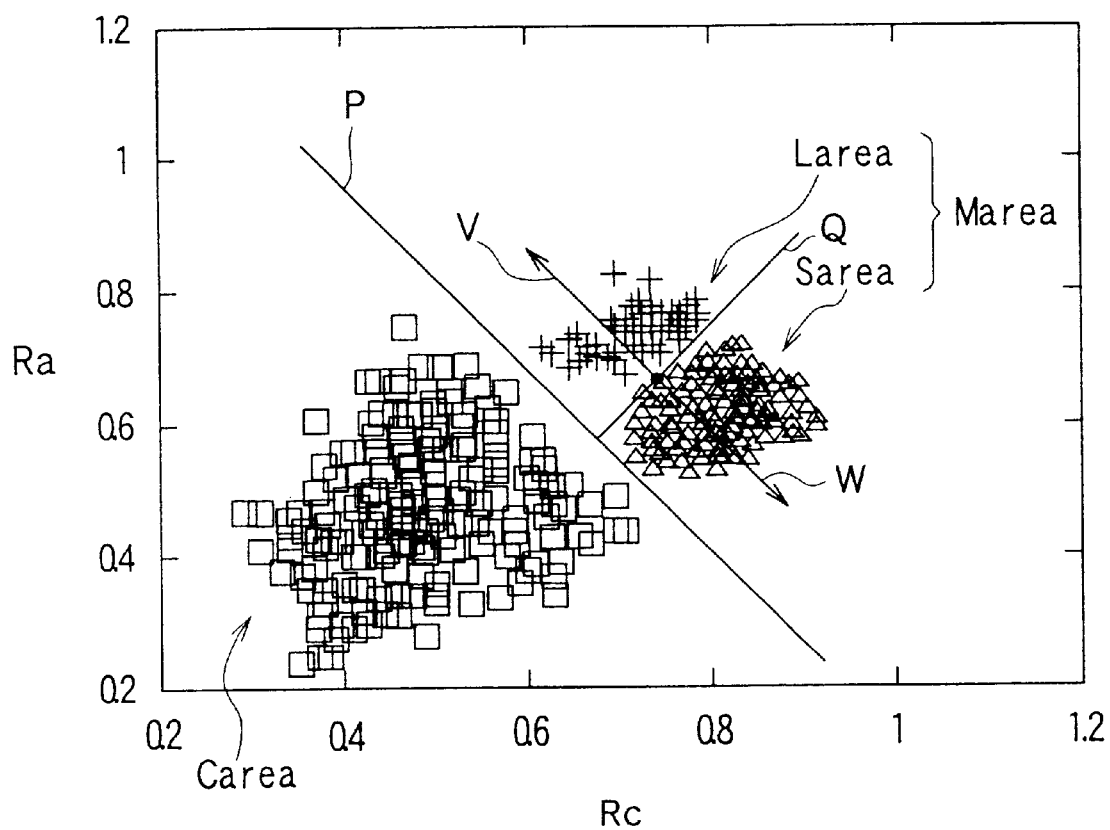
FIG. 9 is a chart defining the human's area, Marea, adult's area, Larea, child's area, Sarea, and child seat, area, Carea according to the relationship between the adult's pattern correlation coefficient and the child's pattern correlation coefficient for a seated person determination apparatus for a seated person according to the present invention.

Consequently, the distribution results shown in FIG. 9 were obtained. In FIG. 9, the large number of plots indicated by + symbols show the relationship between Rc and Ra in large number of adults (weights ranging between 43 Kg and 55 Kg.). The large number of plots indicated by Δ symbols show the relationship between Rc and Ra in large number of children (weight ranging between 15 Kg to 30 Kg.) The large number of plots indicated by □ symbols show the relationship between Rc and Ra in large number of child seats.

According to these results, it can be seen that the plot area indicated by + symbols, the plot area indicated by A symbols, and the plot area indicated by □ symbols are clearly segregated. Therefore, the plot area indicated by + symbols and the plot area indicated by the A symbols were defined as human area, Marea. The plot area indicated by + symbols was defined as adult's area, Larea, and the plot area indicated by A symbols was defined as the child's area, Sarea, and the plot area indicated by □ symbols was defined as child seat's area, Carea.

The straight line P dividing the human area, Marea and the child seat's area, Carea can be defined by the following equation of Number 5 (Refer to FIG. 9.)

$$Ra = \alpha Rc + \beta \qquad \text{[Number 5]}$$

In the equation of Number 5, $\alpha<0$, and $\beta>0$. The straight line Q dividing the adult's area, Larea and the child's area, Sarea can be defined by the following equation of Number 6.

$$Ra = \gamma Rc + \delta \qquad \text{[Number 6]}$$

In this equation of Number 6, $\gamma>0$, and $\delta<0$. Therefore, the human area, Marea can be specified by the following inequality of Number 7.

$$Ra > \alpha Rc + \beta \qquad \text{[Number 7]}$$

Additionally, the child seat's area, Carea can be specified by the following inequality of Number 8.

$$Ra < \alpha Rc + \beta \qquad \text{[Number 8]}$$

The adult's area, Larea can be specified by the inequality of Number 8 and the following inequality of Number 9.

$$Ra > \gamma Rc + \delta \qquad \text{[Number 9]}$$

The child's area, Sarea can be specified by the inequality of Number 7 and the following inequality of Number 10.

$$Ra < \gamma Rc + \delta \qquad \text{[Number 10]}$$

If Rc=0.75 and Ra=0.62 as mentioned above, the inequality of Number 7 can be satisfied. Also, when Rc=0.61 and Ra=0.72, the inequality of Number 7 can be satisfied. Therefore, in these cases, the decision in step 130 would be YES. On the other hand, when Rc=0.52 and Rz=0.60, as mentioned above, the inequality of Number 7 cannot be satisfied. Therefore, the decision in step 130 would be NO. In this first embodiment, $\alpha=-1.5$, $\beta=1.6$, $\gamma=1.0$, and $\delta=-0.06$. When the decision in step 130 is YES, as described above, the value of Hs expressing the build of the body of person seated (hereafter called body build Hs) is calculated based the equation of Number 11 in the next step 131.

$$Hs=Ra-Rc \quad \text{[Number 11]}$$

Here, the rationale for incorporating the equation of Number 11 will be explained in the following. In FIG. 9, if a normal line V is drawn from the straight line Q in the adult's area, Larea, the normal line V will become longer in proportion to the value of (Ra−Rc). On the other hand, if a normal line W is drawn from the straight line Q in the child's area, Sarea, the normal line W will become longer in proportion to the value of (Rc−Ra.) Therefore, if the component of the normal line V or normal line W, orthogonal with respect to the Rc coordinate axis of FIG. 9, is defined as Hs, then, whether or not the condition of Hs>TH is satisfied will determine whether or not it belongs to the adult's area, Larea, or child's area, Sarea. Therefore, the equation Hs=Ra−Rc has been incorporated in the first embodiment of this invention as a relationship to express the body build of the person seated. Accordingly, the relationship Hs>TH has been incorporated as a decision standard in the next step 140. In the first embodiment, TH=−0.06.

Therefore, when Rc=0.75, and Ra=0.62, as described above, the value of Hs is calculated as, Hs=0.75−0.62=0.13. On the other hand, when Rc=0.61 and Ra=0.72, as described above, the value of Hs becomes, Hs=0.61−0.72=−0.11.

Next, in step 140, when Hs=0.13, the decision would be YES, and when Hs=−0.11, the decision would be NO. When the decision in step 140 is YES, the person seated, who is the cause for the shape of the surface distribution of output voltage, is determined as an adult in step 141. If, on the other hand, the decision in step 140 is NO, the person seated, who is the cause for the shape of the surface distribution of output voltage, is determined as a child in step 142 (Refer to FIG. 8.) In addition, if the decision in step 130 is NO, as described above, the person seated, who is the cause for the shape of the surface distribution of output voltage is determined not as a human, but a child seat.

As described above, it has been noted that the shape of the contacting surface formed between the buttocks of the person seated and the seat pad 10*a*, changes little as the sitting attitude of the person seated changes. The degree of conformity between the actual shape of the contacting surface of the buttocks of person seated or the bottom wall of the child seat, and the child's standard pattern Pa and the adult's standard pattern Pb simulating the buttocks of person seated is calculated. This degree of conformity is calculated as the child's pattern correlation coefficient Rc and the adult's pattern correlation coefficient Ra, corresponding to the degree of conformity between the shape of the surface distribution of output voltage and the shape of the standard surface distribution of voltage calculated in step 120.

Then, by deciding whether these correlation coefficients match any of the human area, Marea, adult's area, Larea, child's area, Sarea, or child seat's area, Carea, shown in FIG. 9, it is determined the person seated is an adult, child, or a child seat. Consequently, the accuracy of determining the person, sitting on the seat pad 10*a*, as an adult or child, differentiating it from a child seat, is significantly improved.

Therefore, for example, if the deployment of an air bag of an air bag system installed on an automobile is to be stopped using the result determining the person as a child in step 142, the accuracy of the decision to stop the action can be significantly improved. Consequently, erroneous operation of airbag caused by a mistaken determination that the person seated is an adult could be prevented, and children can be more reliably protected from damages inflicted by airbags. Moreover, if the result of step 132 determining that a child seat is placed on the seat is utilized, stopping the deployment of airbag by mistake when there is no one seated can be avoided.

Figure 10:
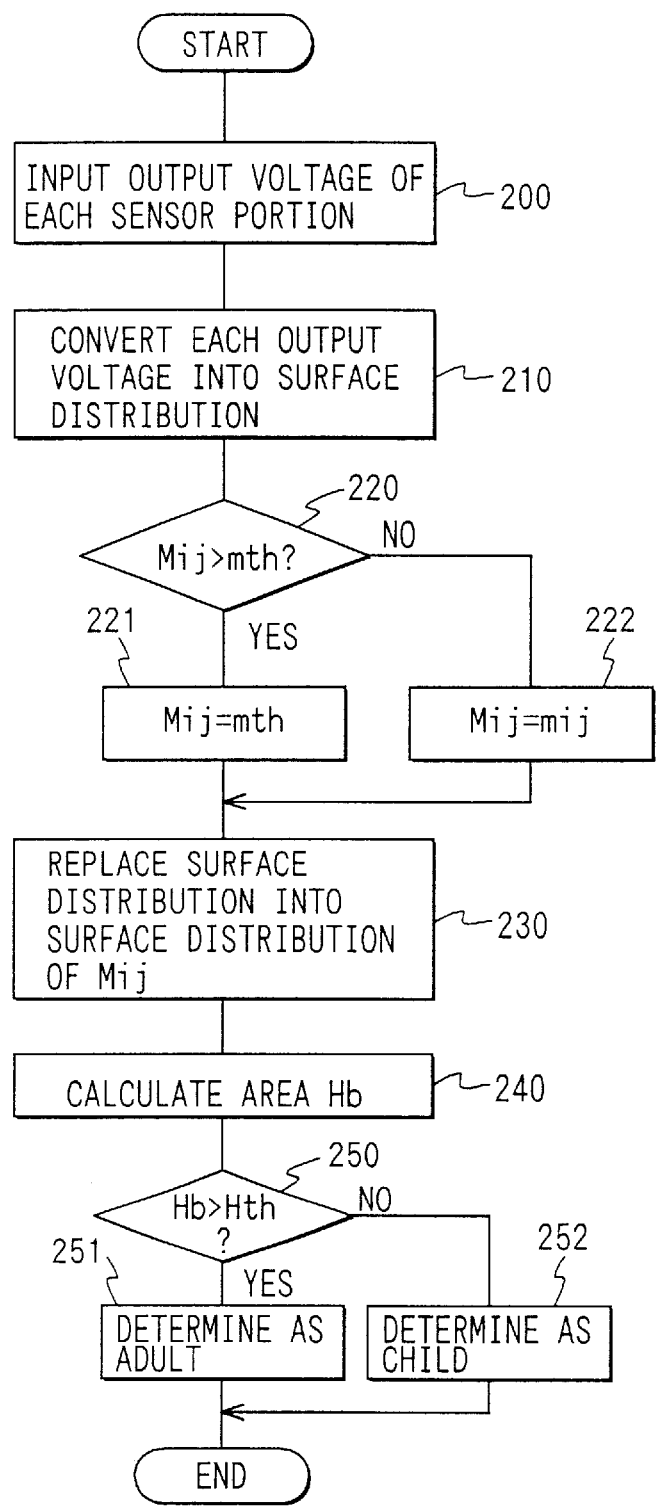
FIG. 10 is a flow chart of a computer program executed by the microcomputer in the second embodiment of the present invention.

The second embodiment of this invention is shown in FIG. 10 through FIG. 12. In the first embodiment, described above, when a child sits on a seat pad 10*a* of the seat 10, occasionally the child sits in the center of the seat pad 10*a*. When this happens, the buttocks of the child sink into the center of the seat pad 10*a* because the seat pad 10*a* is soft. This type of seating condition occurs more frequently for smaller child. In this seating condition, each sensor portion located in positions corresponding to the area surrounding the center of the seat pad 10*a* (in other words, area surrounding the contact area formed between the child's buttocks and the seat pad 10*a*) are pulled down toward the bottom of the seat pad 10*a* (toward the floor of the automobile.) Consequently, these sensor portions will detect the load created by this pulling action, caused by the sinking attitude of the seated child.

Figure 11A:
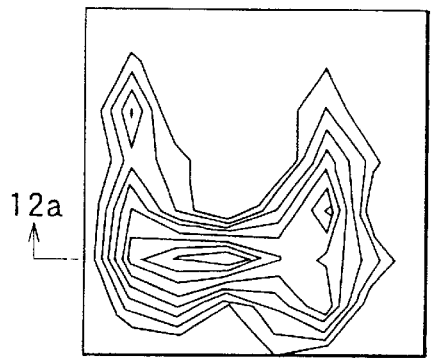
FIG. 11A is a chart showing the shape of the surface distribution of output voltage of the sensor portions when the person seated is a child in a second embodiment of the present invention.
Figure 11B:
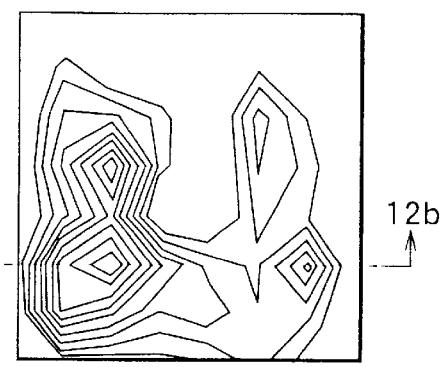
FIG. 11B is a chart showing the shape of the surface distribution of output voltage of the sensor portions when the person seated is an adult in a second embodiment of the present invention.

When the output voltage detected by the sensor portions located at positions corresponding to the area surrounding the center part of the seat pad 10*a*, caused by the pulling load, and the output voltage detected by the sensor portions located at positions corresponding to the center part of the seat pad 10*a*, caused by the seated load of the child, are shown as voltage distribution across the entire seat pad surface 11 of the seat 10, it will be as shown in FIG. 11A. This shape of voltage distribution resembles the shape of voltage distribution generated when an adult is seated on the seat pad 10*a* (Refer to FIG. 11B, and FIG. 6B.). Therefore, erroneous determination will be made, if this shape of voltage distribution is used to determine the type of person seated, whether it is a child or adult.

Various counter measures to overcome this problem and ways to make the correct determination have been studied. Consequently, the following have been found. Specifically, a cross section was made along the line 12*a*—12*a* in the shape of output voltage distribution of the seat sensor 20, corresponding to the seated condition of a child, shown in FIG. 11A. (In other words, a cross section is made in a plane parallel to the left and right direction of the seat pad and perpendicular to the floor of the automobile, or perpendicular to the surface of the seat pad 10*a*.)

Figure 12A:
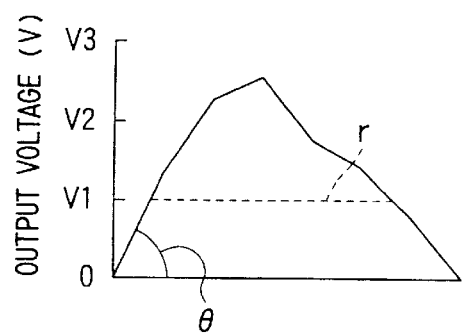
FIG. 12A is a chart showing typical cross section of the shape of the surface distribution of output voltage shown in FIG. 11A for the present invention.
Figure 12B:
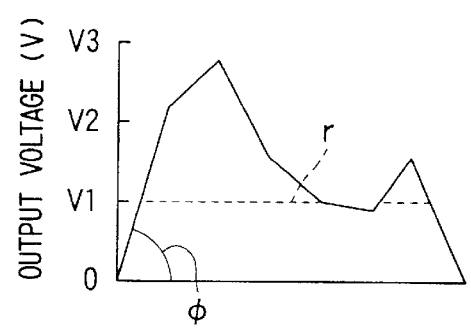
FIG. 12B is a chart showing typical cross section of the shape of the surface distribution of output voltage shown in FIG. 11B for the present invention.

A shape of the cross section of output voltage distribution shown in FIG. 12A was obtained. Similarly, a cross section was made along the line 12*b*—12*b* in the shape of output voltage distribution of the seat sensor 20, corresponding to the seated condition of an adult, shown in FIG. 11B. The cross section was taken at a position corresponding to where the cross section shown in FIG. 11A was taken. A shape of the cross section of output voltage distribution shown in FIG. 12B was obtained. In FIGS. 12A, 12B, when the output voltages were V1, V2, and V3, the corresponding loads were 20 $(g/cm^2)$, 40 $(g/cm^2)$, and 60 $(g/cm^2)$ respectively.

Comparison of each shape of the cross section of output voltage distribution shown in FIGS. 12A and 12B, show the rising angle $\theta$ of the left and right foot (corresponds with the left and right foot of the seat pad 10*a*) of the outline of cross section of output voltage distribution shown in FIG. 12A is less than the rising angle φ of the left and right foot of the outline of cross section of output voltage distribution shown in FIG. 12B. It is clear that the left and right foot of the outline of the cross section of output voltage distribution corresponding to the sinking seating style of a child has a more gradual rise compared with the left and right foot part of the outline of the cross section of output voltage distribution corresponding to the seating style of an adult. This phenomenon holds true in cross sections taken at any position on the left and right plane of each cross section shape of the output voltage distribution shown in FIG. 12A and 12B. The abscissa in FIG. 12 is made to agree with left and right direction of the seat pad surface 11 of the seat pad 10a.

Noting this phenomenon, the computer program executed by the microcomputer 30 has been proposed to follow the flow chart shown in FIG. 10 instead of the flow chart shown in FIG. 4 in the second embodiment of this invention. Additionally, the seat sensor 20 described in the first embodiment, has been changed in the second embodiment of this invention as follows. The sensor portions S1 through Sn (Refer to FIG. 5) are arranged in matrix form comprising p row and q column (Refer to FIG. 5). They are arranged on a plane parallel to the seat pad surface 11 of the seat pad 10a. Accordingly, each sensor portion is indicated as S i j (1i; p, 1–j; q). The output voltage of each sensor portion S i j of the sensor portion S1 through Sn is indicated as m i j. The remainder of the composition is the same as in the first embodiment.

In the second embodiment, as the microcomputer 30 starts to execute the computer program following the flow chart shown in FIG. 10, the output voltage m i j of each sensor portion S i j of the seat sensor 20 is input at step 200. Next, in step 210, each output voltage m i j is converted into a matrix like surface distribution shape consisting of p row and q column. Then, in step 220, each output voltage m i j is successively compared with the threshold voltage m t h, for each output voltage from m 1 1 through m p q. Here, the threshold voltage m t h is set to a value that enables differentiation of the slope of rising angle of the left and right foot of the outline of the shape of the surface distribution of output voltage shown in FIG. 12.

In the second embodiment of the present invention, for example, the threshold voltage corresponds with output voltage V1 (Refer to FIG. 12.). In step 220, mentioned above, each output voltage m 1 1 through m p q are checked to see if they satisfy the condition, m i j>m th. If the condition is satisfied, the decision is YES, and the output voltage is set to M i j=m th in step 221. If the condition is not satisfied, the decision is NO, and the output voltage is set to M i j=m i j in step 222. Then, in step 230, each output voltage m i j out of step 210 is replaced by each output voltage M i j out of steps 221 and 222. This means that the surface distribution of output voltage composed of p row and q column in step 210 is replaced by a surface distribution of output voltage M i j composed of p row and q column. Then, in step 240, the area Hb of the trapezoidal part, located between the abscissa of the shape of cross section of output voltage distribution shown in FIG. 12A or 12B, and the dotted line r drawn parallel to the abscissa (threshold voltage m th=V1), can be calculated by the following equation of Number 12.

$$Hb = (L1+L2)h/2$$

In the equation shown above in Number 12, h indicates the height of the trapezoid measured from the lower base (abscissa) to the upper base (dotted line r). L1 and L2 indicate the length of the upper base and the lower base of the trapezoid, respectively. The abscissa, mentioned above, corresponds with the left and right direction of the surface of seat pad 10a. The lower base L2 corresponds with the left and right direction width of the buttocks of the person seated on the seat pad 10a.

Here, the rationale for incorporating the area Hb of the trapezoidal part will be explained. As described above, the outline of the cross section of output voltage distribution show different rate of rise in the left and right foot as shown in FIGS. 12A and 12B. This difference shows up clearly as a difference in the area Hb of each trapezoidal part. In other words, the difference in the slope of the rise of left and right foot of the outline of the cross section of output voltage distribution, shown in the figure, clearly corresponds with the difference in the area Hb of each trapezoidal part.

This signifies that the differentiation of person seated, whether an adult or a child, can be made reliably by utilizing the difference in the area Hb.

Therefore, the area Hb of the trapezoidal part, described above, has been adopted as a means to differentiate the person seated, whether an adult or a child, in the second embodiment. The rise of the left and right foot of the outline of the cross section of the output voltage distribution shown in FIG. 12A is more gradual than the rise of the left and right foot of the outline of the cross section of output voltage distribution shown in FIG. 12B. Therefore, the area Hb of the trapezoidal part in FIG. 12A is smaller than the area Hb of the trapezoidal part in FIG. 12B.

After the process is finished in step 240, comparison is made between the area Hb and standard area Hth in step 250. The standard area Hth is set to an intermediate value of area between the area Hb of the trapezoidal part in FIG. 12A, and the area Hb of the trapezoidal part in FIG. 12B. The value of the standard area Hth is not limited to an intermediate value mentioned above. Any value in between the area Hb of the trapezoidal part in FIG. 12A, and the area Hb of the trapezoidal part in FIG. 12B is acceptable, so long as differentiation can be made between an adult and a child.

When the area Hb is greater than the standard area Hth, the result of the decision, at step 250 will be YES, and the person seated will be determined as an adult in step 251. On the other hand, when the area Hb is smaller than the standard area Hth, the result of the decision, at step 250 will be NO, and the person seated will be determined as a child in step 252.

As described above, when a child sits in the center of the seat pad 10a in a sinking manner, those sensor portions, out of the sensor portions S i j of the seat sensor 20, located in positions corresponding to the area surrounding the center of the seat pad 10a, are pulled down toward the bottom of the seat pad 10a, causing the sensor portions to detect the resulting load. The shape of the surface distribution of output voltage detected by the sensor portions of the seat sensor 20, in this case, resembles the shape of the surface distribution of output voltage detected by the sensor portions of the seat sensor 20 when an adult is seated on a seat pad. However, as described above, the difference in the shape of the cross section compared at corresponding positions of each shape of the surface distribution, in other words, the difference in each area Hb can be utilized to differentiate an adult from a child. Consequently, a correct and accurate determination can be made.

Additionally, it has been noted that the area Hb of the trapezoidal part in each cross section of output voltage distribution shape shown in FIGS. 12A and 12B are different. In the decision made in step 250, the area Hb and the standard area Hth are utilized. Therefore, it is not necessary to increase the density of sensor portions in the seat sensor 20 to increase its resolution, in order to improve the accuracy of determining the type of person seated. Consequently, the cost of seat sensor 20, and therefore the cost of seated person determination apparatus can be held down.

Figure 14:
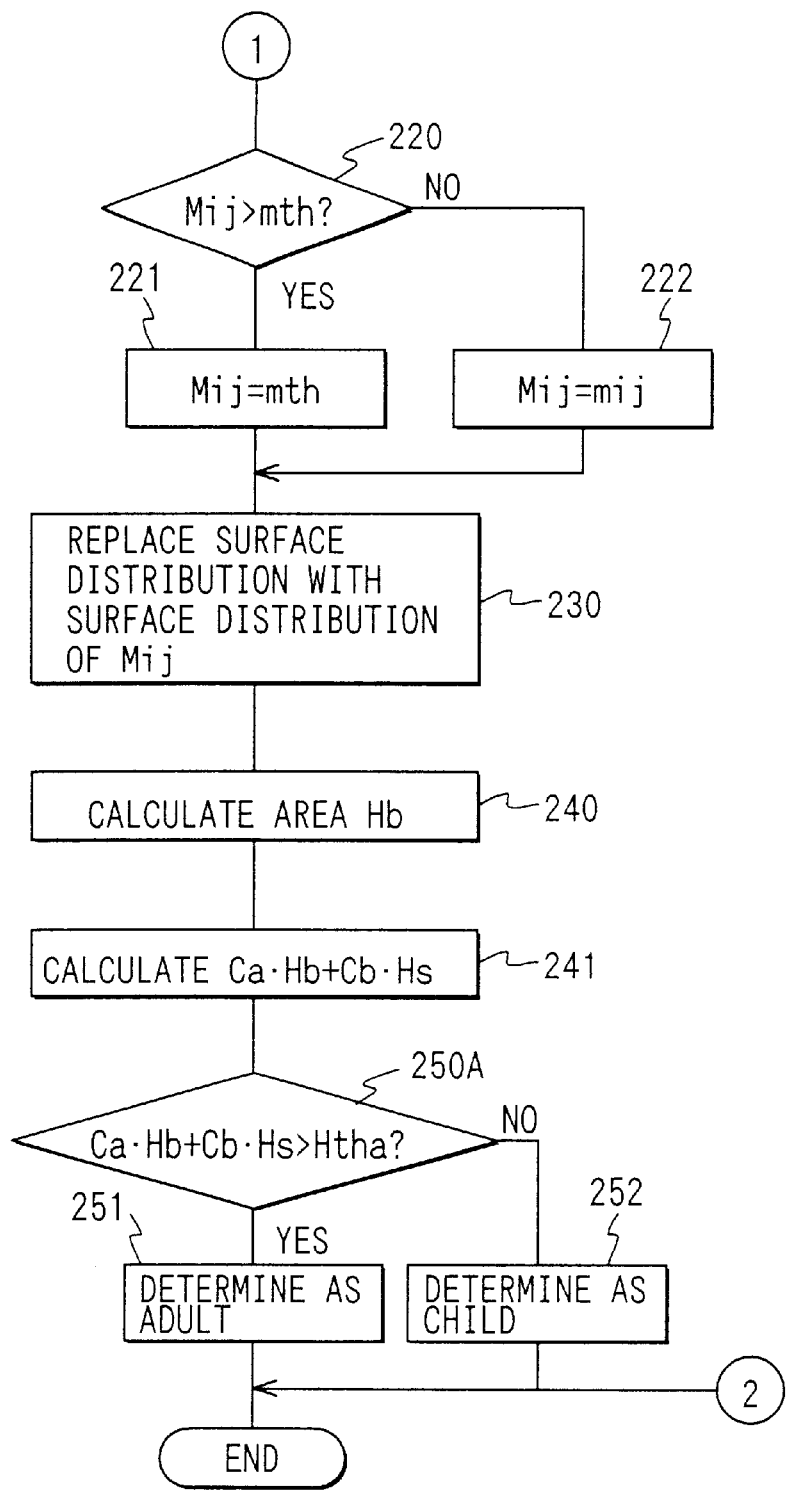
FIG. 14 is a flow chart of computer program executed by the microcomputer in the third embodiment of the present invention.

The third embodiment of the present invention is shown in FIG. 13 through FIG. 15. The third embodiment is a combination of the first and the second embodiment. In the third embodiment, the microcomputer 30, described in the second embodiment, is proposed to execute the computer program shown in the flow chart described in FIG. 13 and FIG. 14, instead of the flow chart described in FIG. 10. The rest of the apparatus is the same as the second embodiment described above.

In the third embodiment, as the processing in steps 200 and 210 are performed the same way as in the second embodiment, the processes in steps 260, 270, 271, and 272 are performed in the same manner as in steps 120, 130, 131, 132 shown in FIG. 4. In other words, in step 260, the degree of conformity, expressing how well the shape of the surface distribution of output voltage of step 210 matches the child's shape of the standard surface distribution of voltage including the child's standard pattern Pa (Refer to FIG. 7A), and the adult's shape of the standard surface distribution of voltage including the adult's standard pattern Pb (Refer to FIG. 7B), is calculated, essentially the same as in step 120. Then, in step 270, it is determined whether or not the child's pattern correlation coefficient Rc and the adult's pattern correlation coefficient Ra, obtained in step 260, matches the human area, Marea (Refer to FIG. 9), the same as the process in step 130. Then, as same as the process in step 130 in the first embodiment, described above, if the decision in step 270 is YES, the body build Hs is calculated based on the equation of Number 11 in step 271, the same as in step 131. If the decision in step 270 is NO, it is determined that the person seated on the seat pad 10a is a child seat in step 272, the same as in step 132.

When the calculation of the body build Hs in step 271 is finished, the processes in step 220 through step 240 is performed, the same as in the second embodiment. Then, when the calculation of the area Hb is finished in step 240, the same as in the second embodiment described above, the value of (Ca·Hb+Cb·Hs) is calculated in step 241. Then it is determined whether or not the following inequality of Number 13 is satisfied.

$$Ca \cdot Hb + Cb \cdot Hs > H\ tha$$

In the inequality of Number 13, Ca and Cb are both positive integers. Hb is the area of the trapezoidal shape described above in the second embodiment. Hs is the body build of the person seated, mentioned above. H tha is a standard area obtained by compensating the area Hb with the body build Hs. The reason for incorporating the inequality of Number 13 is to improve the accuracy of differentiating the person seated. The determination of whether the person seated is a child or an adult is greatly improved by synthesizing the area Hb with additional factor of body build Hs.

Incidentally, the following equation of Number 14 can be obtained by replacing the inequality symbol with equality symbol and rearranging the inequality of Number 13.

$$Hb = -(Cb/Ca) \cdot Hs + (H\ tha/Ca)$$

The rationale for the equation of Number 14 will be explained in the following referring to FIG. 15. The values of area Hb and body build Hs were obtained from a large number of adults and children in the same manner described above.

Consequently, a distribution shown in FIG. 15 was obtained. In FIG. 15, large number of plots shown in Δ symbols shows the relationship between Hb and Hs in large number of adults (weight ranging between 43 Kg to 55 Kg). The large number of plots shown in + symbols show the relationship between Hb and Hs in large number of children (weight ranging between 15 Kg to 30 Kg).

It can be seen from these results, as indicated in FIG. 15, that the area of plots shown in Δ symbols and the area of plots shown in + symbols can be clearly divided by a straight line W. Therefore, the straight line mentioned above was specified by the equation of Number 14. The area above the straight line W, shown in the figure, in other words, the area satisfying the relationship, $Hv > -(Cb/Ca) \cdot Hs + (H\ tha/Ca)$ is the area of adults. Additionally, the area below the straight line W, shown in the figure, satisfying the relationship, $Hb < -(Cb/Ca) \cdot Hs + (H\ tha/Ca)$ is the area of children. In addition, as the difference of Hb with respect to $\{-(Cb/Ca) \cdot Hs + (H\ tha/Ca)\}$ becomes larger, the length of arrow symbol U1 becomes longer in the direction shown in FIG. 15, and as the difference of $\{-(Cb/Ca) \cdot Hs + (H\ tha/Ca)\}$ with respect to Hb becomes larger, the length of arrow symbol U2 becomes longer in the direction shown in FIG. 15. Therefore, the arrow symbol U1 and U2 indicates the left and right direction width of the buttocks of an adult and child, in other words, index for the size of the buttocks.

Then, in step 250A, the value of body build Hs obtained in step 271, and the area Hb obtained in step 240 are substituted in the formula shown in step 241, in other words, the inequality of Number 13, to determine whether or not the inequality of Number 13 can be satisfied. If the condition, Ca·Hb+Cb·Hs>H tha is satisfied, the decision in step 150 will be YES, and the person seated will be determined as an adult in step 251. On the other hand, if the condition, Ca·Hb+Cb·Hs<H tha is satisfied, the decision in step 250A will be NO, and the person seated will be determined as a child.

In the first embodiment described above, the relationship Hs>TH was used as a standard of decision in step 140. However, it is not limited to this particular relationship. For example, the length of the normal line V or W can be used in place of the length Hs. In addition, the equation of Number 9 may be adopted as a standard of decision in step 140.

The human area, Marea, adult's area, Larea, child's area, Sarea, and child seat's area, Carea described in the first embodiment, in other words, both straight lines P and Q need not be limited to those shown in FIG. 9. They can be changed as necessary. Additionally, in the second embodiment, an example using an area Hb for decision in step 250 was described. However, the rising angle θ or φ of the foot of the shape of the surface distribution of output voltage, shown in FIG. 12, can be used in place of the area Hb. In this case, the standard area H th in step 250 can also be substituted with a value between the rise angle θ and the rise angle φ.

Additionally, in the second embodiment, described above, an example of calculating the area Hb in step 240 was explained. However, an integrated value obtained by integrating the area Hb in the front to rear direction of the seat pad 10a, in other words, volume can be used in place of Hb. In this case, the decision standard H th used in step 250 should also be changed to a corresponding standard volume.

Also, in the second embodiment described above, in the calculation of the area Hb, if the output voltage from the sensor portions of seat sensor 20, out of each sensor portion of the seat sensor 20, that corresponds to the part of seat pad 10a contacting the thighs of the person seated is included, the accuracy of the area Hb will be lower, and therefore the accuracy of the decision made in step 250 will also suffer. Therefore, a frame corresponding to the size of adult's buttocks is used as a mask. Only those output voltage m i j of the sensor portions positioned within the frame, in other words, only the corresponding values of M i j will be used to calculate the area Hb. The accuracy of Hb can be improved in this manner, and the accuracy of the decision in step 250 can be improved, as well. Additionally, in the third embodiment described above, the following alternative logic may be adopted. The step 140 shown in FIG. 4 and step 250 shown in FIG. 10 can be used instead of step 250A. When the decision in step 140 is YES, the next decision is made in step 250. If the decision in step 250 is YES, the person seated is determined as adult in step 251. If the decision in step 140 is NO, or if the decision in step 250 is NO, the person seated is determined as a child in step 252.

In the second embodiment described above, an example of processing was explained where the processes following step 220 is performed after each output voltage is converted into surface distribution shape in step 210. However, an alternative approach where the processing in step 210 is deleted, and each output voltage M i j is converted to surface distribution shape in step 230 may be adopted instead. Additionally, in the first embodiment described above, an example of converting the output voltage of each sensor portion of the seat sensor 20 into surface distribution in step 110 was explained. However, an alternative method may be to convert the load corresponding to each output voltage into surface distribution. In this case, the calculation of the degree of conformity between the shape of the surface distribution of output voltage and the shape of the standard surface distribution of voltage may be replaced with the calculation of a degree of conformity between the shape of the surface distribution of the load corresponding to the shape of the surface distribution of output voltage and the shape of the standard surface distribution of the load corresponding to the shape of the standard surface distribution of voltage. The same operational effect as those in the first embodiment described above can be attained in this manner.

In addition, in the second embodiment described above, the load corresponding to the output voltage of each sensor portion of the seat sensor 20 may be converted into surface distribution, instead of the output voltage of each sensor portion of seat sensor 20 in step 210. In this case, the value of threshold load corresponding to the threshold voltage, m t h, and the load corresponding to the output voltage m i j, are adopted in step 220, in place of the output voltage m i j and threshold voltage m th. Then, the processing in steps 221, 222, and 230 can be made essentially the same as in the second embodiment described above, using the load corresponding to the output voltage m i j, and the threshold load values corresponding to the threshold voltage m t h. In addition, in the implementation of this invention, the adult and child mentioned in the embodiments described above are assumed to have the body build characteristic of adult and child respectively. Consequently, a child having a body build of an adult will be classified as an adult, and an adult having a body build of a child will be classified as a child. By utilizing this method of differentiation, the type of person seated, adult or child can be differentiated from a child seat, more accurately.

Additionally, in the implementation of this invention, the application is not limited to automobile seats, but it may be applied to seats in all forms of vehicles, as well.

While the above-described embodiments refer to examples of usage of the present invention, it is understood that the present invention may be applied to other usage, modifications and variations of the same, and is not limited to the disclosure provided herein.

What is claimed is:

1. A seated person determination apparatus for a vehicle seat, comprising:
    a seat sensor composed of a plurality of sensor portions placed in a seat pad of the vehicle seat, the sensor portions being distributed along a plane parallel to a surface of the vehicle seat, wherein a load exerted on the surface of the vehicle seat by a seated person or an object placed on the vehicle seat is detected by the plurality of sensor portions as a detected load;
    a calculating device that calculates a degree of conformity between a shape of a surface distribution of the detected load and a shape of a standard surface distribution of a load, wherein the shape of the standard surface distribution of the load simulates a shape of a contact surface formed by a buttocks of a person seated and the surface of the seat, wherein the degree of conformity is calculated as a child's pattern correlation coefficient and an adult's pattern correlation coefficient and uses a cross correlation method; and
    a decision device that differentiates the type of person seated from an object placed on the seat according to a degree of conformity between the shape of the surface distribution of the detected load and the standard surface distribution of the load.

2. A seated person determination apparatus for a vehicle seat, comprising:
    a seat sensor composed of a plurality of sensor portions placed in a seat pad of the vehicle seat, the sensor portions being distributed along a plane parallel to a surface of the vehicle seat, wherein a load exerted on the surface of the vehicle seat by a seated person or an object placed on the vehicle seat is detected by the plurality of sensor portions as a detected load:
    a calculating device that calculates a degree of conformity between a shape of a surface distribution of the detected load and a shape of a standard surface distribution of a load, wherein the shape of the standard surface distribution of the load simulates a shape of a contact surface formed by a buttocks of a person seated and the surface of the seat; and
    a decision device that differentiates the type of person seated from an object placed on the seat according to a degree of conformity between the shape of the surface distribution of the detected load and the standard surface distribution of the load; wherein
        the degree of conformity is calculated as a child's pattern correlation coefficient and an adult's pattern correlation coefficient and uses a cross correlation method; and
        the decision device determines whether the child's pattern correlation coefficient or the adult's pattern correlation coefficient matches a human area or an area of an object placed on the seat, said human area and the area of the object placed on the seat are established by matching a distribution of the correlation coefficients with a plurality of cases of human and objects placed on the seat.

3. A seated person determination apparatus for a vehicle seat, comprising:
    a seat sensor composed of a plurality of sensor portions placed in a seat pad of the vehicle seat, the sensor portions being distributed along a plane parallel to a surface of the vehicle seat, wherein a load exerted on the surface of the vehicle seat by a seated person or an object placed on the vehicle seat is detected by the plurality of sensor portions as a detected load:

a calculating device that calculates a degree of conformity between a shape of a surface distribution of the detected load and a shape of a standard surface distribution of a load, wherein the shape of the standard surface distribution of the load simulates a shape of a contact surface formed by a buttocks of a person seated and the surface of the seat: and a decision device that differentiates the type of person seated from an object placed on the seat according to a degree of conformity between the shape of the surface distribution of the detected load and the standard surface distribution of the load; wherein the degree of conformity is calculated as a child's pattern correlation coefficient and an adult's pattern correlation coefficient utilizing a cross correlation method; and the decision device determines whether the child's pattern correlation coefficient or the adult's pattern correlation coefficient matches the adult's area, child's area, or an object placed on the seat area, wherein the adult's area, child's area and object placed on the seat area are established by matching a distribution of correlation coefficients with predetermined numbers of cases of adults, children and objects on the seat.

4. The seated person determination apparatus for a vehicle seat, comprising:

a calculating device that calculates a degree of conformity between a shape of a surface distribution of the detected load and a shape of a standard surface distribution of a load, wherein the degree of conformity is calculated as a child's pattern correlation coefficient and a adult's pattern correlation coefficient by using a cross correlation method;

a decision device that determines whether a child's pattern correlation coefficient and an adult's pattern correlation coefficient match an adult's area or a child's area, the adult's area and the child's area are established by matching a distribution of a correlation coefficients with a plurality of cases of adults and children seated on the seat.

5. A seated person determination apparatus according to claim 1, further comprising:

a rate increase calculating device that calculates a rate of increase of a detected load for each sensor portion that increases as a position is moved from one side of a seat pad surface to another side of the seat pad surface in left and right direction; and wherein the decision device makes the determination based on both the degree of conformity and the calculated rate of increase.

6. A seated person determination apparatus as claimed in claim 1, further comprising:

a sum calculating means for calculating a sum of each detected load of each sensor portion that shows movement of the seated person from opposite sides of the seat pad surface in a left and right direction toward its center in left and right direction, said means to calculate calculating in a range less than the prescribed load; and the decision device makes the determination based on both the degree of conformity and the sum of the load calculated by the means to calculate the sum.

7. A seated person determination apparatus as claimed in claim 1, further comprising:

means to calculate the sum of each detected load out of the detected load of the plurality of sensor portions that shows movement of the seated person from opposite sides of the seat pad surface toward its center, on a surface parallel to the plane orthogonal to the surface of seat pad, wherein the means to calculate calculates in a range less than the prescribed load; and wherein the decision device makes the determination based on both the degree of conformity and the sum of the load calculated by the means of calculating the sum.

8. A seated person determination apparatus for a vehicle seat, comprising:

a seat sensor composed of the plurality of sensor portions -placed in the seat pad of a vehicle seat, wherein the sensor portions are distributed in a plane parallel to the surface of the seat, the load exerted on the surface of the seat by a person seated or by an object placed on the seat is detected by the plurality of sensor portions of the seat sensor located in corresponding positions;

a conformity calculating device calculating a degree of conformity between the shape of the surface distribution of the load detected by the plurality of sensor portions mentioned above, and the shape of the standard surface distribution of the load, the shape of the standard surface distribution of the load simulates the shape of contact surface formed by the buttocks of the person seated and the surface of seat, wherein the degree of conformity is calculated as a child's pattern correlation coefficient and an adult's pattern correlation coefficient and uses a cross correlation method;

a detected load sum calculating device, out of the detected load of the plurality of sensor portions, that shows movement of the seated person from opposite sides of the seat pad surface toward its center, the calculation being made in a range less than the prescribed load;

a means to synthesize synthesized data that enable determination of whether the person seated is a child or adult, said data from the sum of the load calculated by the means of calculating the sum and the degree of conformity and a decision device to determine whether the person seated is a child or adult, said detection means differentiating the child or adult from an object placed on the seat based on the synthesized data.

9. A seated person determination apparatus for a vehicle seat, comprising:

a seat sensor composed of the plurality of sensor portions placed in the seat pad of a vehicle seat, the sensor portions are distributed in a plane parallel to the surface of the seat, the load exerted on the surface of the seat by the person seated or object placed on the seat pad is detected by the plurality of sensor portions of the seat sensor located in corresponding positions;

a conformity calculating device calculating a degree of conformity between a shape of the surface distribution of the load detected by the plurality of sensor portions and a shape of the standard surface distribution of the load, wherein the shape of the standard surface distribution of the load simulates the shape of contact surface formed by the buttocks of the person seated and the surface of seat, wherein the degree of conformity is calculated as a child's pattern correlation coefficient and an adult's pattern correlation coefficient and uses a cross correlation method;

a detected load sum calculating device summing the sensor portions that show movement of the seated person from opposite sides of the seat pad surface toward its center on a surface parallel to the plane orthogonal to the surface of seat pad, wherein the detected load sum calculating device calculates in a range less than the prescribed load;

a data synthesizing device that enables determination of whether the person seated is a child or adult from the sum of the load calculated by the detected load sum calculating device and the degree of conformity; and a decision device to determine whether the person seated is a child, adult, or object placed on the seat based on said synthesized data.

10. A seated person determination apparatus for a vehicle seat, comprising:

a seat sensor composed of a plurality of sensor portions placed in a seat pad of the vehicle seat, wherein the sensor portions are distributed in a plane parallel to a surface of the vehicle seat, the load exerted on a surface of the seat by a person seated is detected by the plurality of sensor portions of a respective sensor portion;

a conformity calculating device calculating a degree of conformity between a shape of a surface distribution of a load detected by the plurality of sensor portions and a shape of a standard surface distribution of a load, the shape of the standard surface distribution of the load simulates a shape of a contact surface formed by a buttocks of the person seated and the surface of seat, wherein the degree of conformity is calculated as a child's Pattern correlation coefficient and an adult's pattern correlation coefficient and uses a cross correlation method;

a detected load summing device that sums a load detected by each sensor portion that shows movement of the seated person from opposite sides of the seat pad surface toward the center of the seat pad surface, wherein the sum is calculated in a range less than the prescribed load;

a data synthesizing device that enables determination of whether the person seated is a child or adult from a sum of the load calculated by the detected load summing device and the degree of conformity; and a decision device that determines whether the person seated is a child or adult based on synthesized data from the data synthesizing device.

11. A seated person determination apparatus for a vehicle seat, comprising:

a seat sensor having a plurality of sensor portions placed in a seat pad of the vehicle seat, wherein the sensor portions are distributed in a plane parallel to a surface of the vehicle seat, a load exerted on the surface of the seat by a person seated is detected by respective sensor portions;

a conformity calculating device calculating a degree of conformity between a shape of a surface distribution of the load detected by the plurality of sensor portions and a shape of a standard surface distribution of the load, the shape of the standard surface distribution of the load simulates the shape of contact surface formed by a buttocks of the person seated and the surface of seat, wherein the degree of conformity is calculated as a child's pattern correlation coefficient and an adult's Pattern correlation coefficient and uses a cross correlation method;

a detected load sum calculating device that sums a load of each sensor portion that shows increasing tendency as a position is moved from opposite sides of the seat pad surface toward a center of the seat pad on a surface parallel to a plane orthogonal to a surface of seat pad, a calculation being made in a range less than the prescribed load;

a data synthesizing device that enables determination of whether the person seated is a child or adult from the sum of the load calculated by the detected load sum calculating device and the degree of conformity; and a decision device that determines whether the person seated is a child or adult based on said synthesized data.

12. A seated person determination apparatus for a vehicle seat, comprising:

a seat sensor composed of a plurality of sensor Portions placed in a seat pad of the vehicle seat, wherein the sensor portions are distributed in a plane parallel to a surface of the vehicle seat, the load exerted on a surface of the seat by a person seated is detected by the plurality of sensor portions of a respective sensor portion;

a conformity calculating device calculating a degree of conformity between a shape of a surface distribution of a load detected by the plurality of sensor portions and a shape of a standard surface distribution of a load, the shape of the standard surface distribution of the load simulates a shape of a contact surface formed by a buttocks of the person seated and the surface of seat:

a detected load summing device that sums a load detected by each sensor portion that shows movement of the seated person from opposite sides of the seat Pad surface toward the center of the seat pad surface, wherein the sum is calculated in a range less than the prescribed load;

a data synthesizing device that enables determination of whether the person seated is a child or adult from a sum of the load calculated by the detected load summing device and the degree of conformity; and a decision device that determines whether the person seated is a child or adult based on synthesized data from the data synthesizing device; wherein the conformity calculating device calculates the degree of conformity from the shape of the standard surface distribution of the load and the shape of the surface distribution of the detected load, the degree of conformity is calculated as a child's pattern correlation coefficient and an adult's pattern correlation coefficient utilizing a cross correlation method; and the data synthesizing device synthesizes synthesized data based on the sum of the load calculated by the detected load sum calculating device and the difference between the adult's pattern correlation coefficient and the child's pattern correlation coefficient.

* * * * *